(12) United States Patent
Allen et al.

(10) Patent No.: US 11,353,363 B2
(45) Date of Patent: Jun. 7, 2022

(54) MONOLITHIC SPECTROMETER

(71) Applicant: Integrated Device Technology, Inc., San Jose, CA (US)

(72) Inventors: Dan Allen, Springville, UT (US); Viresh Patel, Austin, TX (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 169 days.

(21) Appl. No.: 16/584,433

(22) Filed: Sep. 26, 2019

(65) Prior Publication Data

US 2021/0096025 A1 Apr. 1, 2021

(51) Int. Cl.
*G01J 3/02* (2006.01)
*G01J 3/28* (2006.01)
*G01J 3/51* (2006.01)

(52) U.S. Cl.
CPC ........... *G01J 3/0259* (2013.01); *G01J 3/0205* (2013.01); *G01J 3/2823* (2013.01); *G01J 3/51* (2013.01)

(58) Field of Classification Search
CPC ...... G01J 3/0205; G01J 3/0259; G01J 3/2823; G01J 3/51
USPC ........................................................ 356/326
See application file for complete search history.

(56) References Cited

U.S. PATENT DOCUMENTS

| | | | | |
|---|---|---|---|---|
| 6,171,885 B1* | 1/2001 | Fan | .................... | H01L 27/14609 257/E27.132 |
| 6,395,576 B1* | 5/2002 | Chang | ............... | H01L 27/14609 257/E27.132 |
| 6,495,813 B1* | 12/2002 | Fan | .................... | H01L 27/14603 250/208.1 |
| 2002/0036828 A1* | 3/2002 | Wong | ...................... | G02F 1/195 359/585 |
| 2007/0029277 A1* | 2/2007 | Jacobowitz | ....... | H01L 31/02327 216/24 |
| 2008/0048102 A1* | 2/2008 | Kurtz | ............... | H01L 31/02325 250/226 |
| 2011/0211185 A1* | 9/2011 | Jak | ...................... | G03F 7/70191 355/71 |
| 2019/0237500 A1* | 8/2019 | Enichlmair | ....... | H01L 27/14623 |

* cited by examiner

*Primary Examiner* — Sunghee Y Gray
(74) *Attorney, Agent, or Firm* — Haynes and Boone, LLP

(57) ABSTRACT

In some embodiments, a spectrometer is presented. In accordance with some embodiments, the spectrometer includes an optical sensor array, the optical sensor array including a substrate and an array of pixels formed on the substrate; a spectral filter array formed over the pixels of the optical sensor array, the spectral filter array filtering incident light such that each pixel receives light of a spectral transmission profile associated with the pixel; a transparent spacer formed over the spectral filter array; and an opaque mask having input apertures allowing light through the transparent spacer and onto a portion of the spectral filter array. The spectrometer can be formed from the optical sensor array using a combination of photolithographic techniques and bonding of certain layers.

6 Claims, 4 Drawing Sheets

MONOLITHIC SPECTROMETER

TECHNICAL FIELD

Embodiments of the present invention are related to spectrometer sensors and, in particular, to a monolithic spectrometer.

DISCUSSION OF RELATED ART

Spectrometers can be introduced to mobile devices for a variety of uses involving analysis and identification of target substances. In general, a spectrometer refers to a device that discriminates the relative amounts of different frequency or wavelengths in a light source. Spectrometers are often used in conjunction with a reference light source which is directed off or through a target in order to determine the target's spectral characteristics. The light provided by the light source can be any frequency or range of frequencies and can be continuous during the time the spectrometer is active or may be pulsed. These parameters depend on the particular application. One particular application, for example, uses a light source that produces infrared or near-infrared radiation.

When illuminated by the reference light source, the target substance absorbs at least a part of the incident radiation emitted by the light source and radiates a characteristic spectrum of light that, when properly analyzed, can be used to identify constituent components of the substance. The light received from the target substance is spectrally analyzed by the spectrometer and the spectral composition of the received light is indicative of the chemical composition of the substance, or a relevant physical property.

Determining the chemical composition of a substance has a number of practical applications. For example, the spectral scan of fruits and vegetables can help determine the ripeness or nutritional value provided. Safety of food or drinks can also be determined real-time by spectral scanning. Spectroscopic scans can also be used to monitor health issues, for example the oxygen or sugar content of blood without actually taking blood samples. Furthermore, spectroscopic scanning can be used to monitor atmospheric conditions such as the constituents of the gas.

Also, spectral scans of ambient light (in the absence of light from a light source) can be used to adjust light level sensitivities for a camera for adjusting color balance and exposure. Such a method can help achieve more accurate photographs on a mobile device.

Spectrometers typically use dispersive elements such as gratings to separate light into spectral bands. The bands can be detected by rotating the grating across a detector, or by placing a multi-element detector such that each element detects a portion of the spectrum. These have a known tradeoff of resolution and compactness. To make a more compact solution, spectrometers based on arrays of filters have been developed. In one example, a variety of filters is patterned or aligned over an image sensor array. The intensity of light received on each channel is determined by the passband of the filter over that respective pixel. The received pattern of light may be transformed to a wavelength basis representation of the light intensity by a linear transformation. For spectrometers formed as filter arrays on top of image sensors, the light ray angle distribution may be set with an input aperture a fixed distance from the array. In some cases, a lens can be used to collimate the light that has passed through the aperture. However, the additional size and complexity required for collimation may not be desirable for compact, low cost applications. The farther the aperture is from the filter array, the more like a point source it becomes and the smaller the angle to the edge and corners. Limited angles and light ray angle spread is generally beneficial for spectral discrimination. However, alignment of optical elements above the image sensor array requires precision assembly steps.

Therefore, there is a need to develop better, more robust and manufacturable spectrometers that provide a simpler assembly at the wafer scale.

SUMMARY

In some embodiments, a spectrometer is presented. In accordance with some embodiments, the spectrometer includes an optical sensor array, the optical sensor array including a substrate and an array of pixels formed on the substrate; a spectral filter array formed over the pixels of the optical sensor array, the spectral filter array filtering incident light such that each pixel receives light of a spectral transmission profile associated with the pixel; a transparent spacer formed over the spectral filter array; and an opaque mask having input apertures allowing light through the transparent spacer and onto a portion of the spectral filter array.

A method of forming a spectrometer according to some embodiments includes depositing an opaque material over an optical sensor array; forming output apertures over pixels in the optical sensor array; depositing a dielectric focal layer over the opaque material and the output apertures; forming a spectral filter array over the dielectric focal layer, the spectral filter array including a spectral filter over each pixel of the optical sensor array, the spectral filter array having subwavelength structures that focus light of particular wavelengths on each pixels of the optical sensor array; attaching a transparent spacer over the spectral filter array; forming an opaque layer with input apertures on the transparent spacer; and singulating to form individual spectrometers.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Embodiments of the present invention include a monolithic spectrometer with one or more input apertures that results in simple, low cost and robust assembly. The spectrometer can include a light sensor array of pixels, such as a CMOS, CCD or IR-ROIC used for imaging. However, the light sensor array is not used for imaging. Each pixel of the light sensor array shares a similar field of view because light either comes from a strong diffuser or diffuse source/target. The pixels have spectral filters positioned over them. The spectral filters can be based on a dispersive lens and aperture combination. The focal length of the dispersive lens varies with different wavelengths of light. The output aperture can be a spatial filter and functions as a spectral bandpass filter. The spectral filters may have a spectral width such that each pixel receives a spectral transmission profile that is unique to the pixel. The signal from each of the pixels can then be analyzed given the spectral transmission profiles of the various pixels to determine the spectrum of the incident light.

In spectrometers according to some embodiments of the present invention all the optics may be formed monolithically on top of the image sensor array. In accordance with some embodiments, the formation of the optics on top of the image sensor array is accomplished via wafer-scale processes. There may be one or more input apertures above the sensor image array. When multiple smaller apertures are used to illuminate respective portion of the sensor arrays, a much smaller overall height can be achieved, enabling diverse space-constrained applications and potentially reduced costs.

Figure 1:
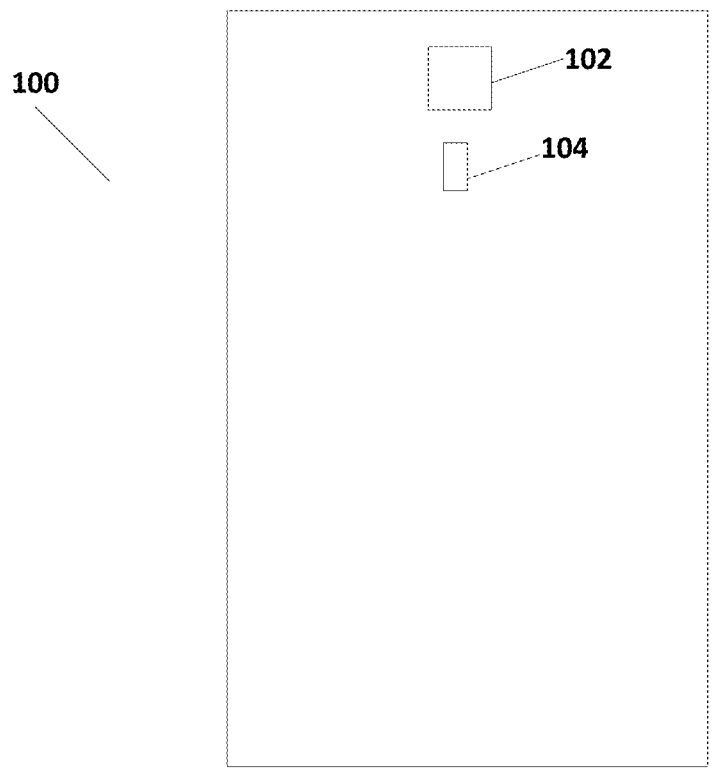
FIG. 1 illustrates a mobile device that incorporates a spectrometer.

FIG. 1 illustrates a mobile device 100, for example a smart phone or tablet, that can include a spectrometer 104 according to some embodiments of the present invention. Mobile device 100 includes an integrated system of processors, circuitry, and user interfaces to provide services to a user of mobile device 100. Such services can include, for example, internet services, cell phone services, data storage, and other common functions of such a device. In addition, mobile device 100 includes a camera 102, which can be used for various photographic purposes. Additionally, in some implementations, mobile device 100 includes spectrometer 104. Spectrometer 104 is coupled to the processor of mobile device 100 and, under the control of mobile device 100, can take spectroscopic data and analyze the spectroscopic data acquired.

As discussed above, the spectroscopic data can be used to adjust the color of photographs taken by camera 102 and may further be used to determine the chemical composition of target substances. From the spectroscopic data, the quality and ripeness of fruits and vegetables can be determined, along with the composition of other substances. Furthermore, the target may be biological, and the spectroscopic data used to measure various health conditions. Consequently, having a handheld accurate spectrometer, such as that built into mobile device 100, can be a very valuable tool not just for scientific purposes, but also for more utilitarian purposes such as health monitoring, environmental monitoring, counterfeit detection and authenticity confirmation, product ID, color search and color matching, and other uses.

Figure 2A:
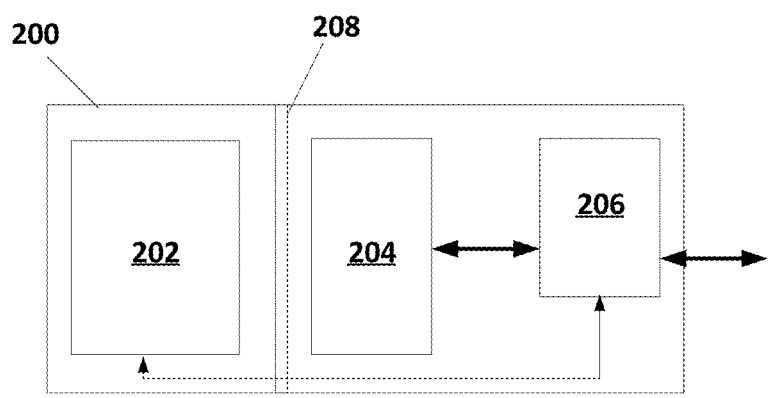
FIGS. 2A, 2B, and 2C illustrate a spectrometer according to some embodiments that can be used in the mobile device illustrated in FIG. 1.

FIG. 2A illustrates a block diagram of a spectrometer 200 that can be used as spectrometer 104 in mobile device 100. As illustrated in FIG. 2A, spectrometer 104 can include a light source 202, a sensor array 204, and processing circuitry 206. Light source 202 can be any source of light used by the spectrometer, including one or more LEDs for producing near IR light, for example. In some embodiments, light source 202 can be an array of LEDs. In some embodiments, the array of LEDs can be dual junction LEDs where the junctions have different emission wavelengths, which can result in provided a broader range of wavelengths in a smaller form factor. In some embodiments, light source 202 can be a flash having an array of LEDs of varied wavelengths. In some embodiments, light source 202 can be a phosphor-converted LED flash. In some embodiments, light source 202 may be the flash of camera 102.

Sensor array 204 can be a sensor array according to some embodiments capable of measuring a spectral range of light that is appropriate to the purpose of spectrometer 104. For example, sensor array 204 can include a CMOS device having an array of individual pixels or other array of light sensitive areas that produce electrical signals that can be further processed. In some embodiments, sensor array 204 detects wavelengths in the visible range, near IR, or UV. In some embodiments, sensor array 204 detects wavelengths less than about 1100 nanometers. In some embodiments, sensor array 204 detects wavelengths less than about 2.5 microns. Processing circuitry 206 can include pixel reading circuitry and pixel driving circuitry as well as controllers or processors, including microprocessors and microcomputers, for receiving data from sensor array 204, processing that data, and providing the data to the microprocessors in mobile device 100 for further analysis and display to the user.

Processing circuitry 206 may also control the intensity and duration of light produced by light source 202, which may be pulsed or continuous, and may gate sensor array 204 accordingly. In some embodiments, a pulse of light of a particular duration may be produced by light source 202 followed by a data acquisition period where sensor array 204 receives the incoming light and accumulates a charge or voltage related to the intensity of light received. Processing circuitry 206, after some acquisition period, then reads integrated values of light received by the pixel array in sensor array 204. In some embodiments, a decay process may be monitored by periodically sampling the integrated values to determine the light received as a function of time. In some embodiments, light source 202 may be a camera flash, which can then be controlled by processing circuitry either directly or through microprocessors or microcomputers in the host device such as mobile device 100.

As is further illustrated in FIG. 2A, light source 202, sensor array 204, and processing circuitry 206 can be packaged on a wafer chip 208. In some embodiments, a structure 210 separates sensor array 204 from light source 202 to prevent light produced by light source 202 from directly entering sensor array 204.

Figure 2B:
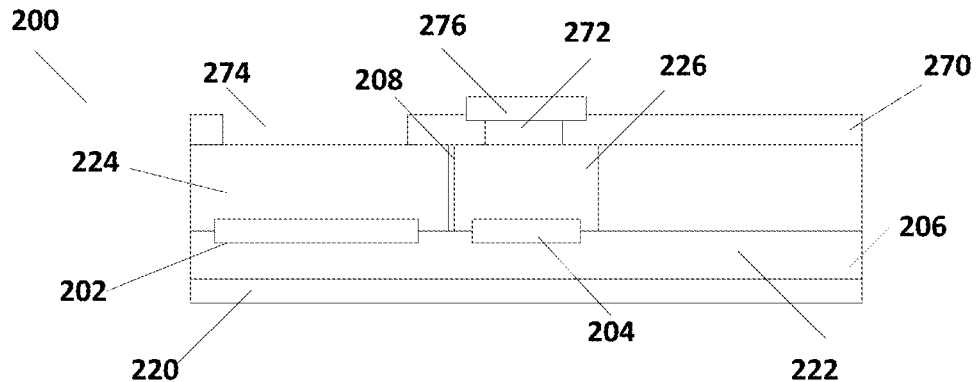

FIG. 2B illustrates a cross-sectional view of an embodiment of a spectrometer 200. As is illustrated in FIG. 2B, spectrometer 200 can be formed on a wafer substrate 220. As is further illustrated in FIG. 2B, a semiconductor layer 206 is formed on substrate 220, where the silicon components of processing circuitry 206 is formed as well as circuitry for driving light source 202 and sensor array 204. Sensor array 204 and light source 202 are formed in or on semiconductor layer 222. As is further illustrated, an optically transparent layer 224 is provided over light source 202. Optically transparent layer 224 may further include some optics, for example lensing structures, filter structures, or other optical structures, for transmitting light from light source 202 for irradiating a target substance. Optically transparent layer 224 may be an air gap. Layer 226 is also an optical layer that, in some embodiments, provides focusing, filtering, and dispersion functions to direct light received at layer 226 onto individual pixels of sensor array 204. In some implementations, especially in previously developed systems, some external optics may be provided external to spectrometer chip 104 to provide focusing, filtering, and other functions. However, in embodiments of the present invention, layer 226 includes the optics that filter and focus incoming light from the target sample. In embodiments that use a camera flash instead of light source 202, spectrometer 200 may be smaller and only include sensor array 204 and supporting circuitry.

As is further illustrated in FIG. 2B, a cover 270 can be placed on optically transparent layer 224 and optically transparent layer 226. Cover 270 may be an opaque hard-protected cover, for example formed of plastic, which may be formed to encapsulate spectrometer 200. A limiting aperture 272 can be formed on cover 270 over sensor array 204. Limiting aperture 272 provides light access, similar to the functioning of a pinhole in a pin-hole camera, to sensor array 204 and controls the light access to limiting aperture 272. In some embodiments, limiting aperture 272 can be circular and admit light in a range of angles limited to about twenty degrees. High angle rays can have the effect of washing out the spectral features at the focus, so it is useful to block unnecessary light. The size of the opening scales with the height of the cover. An additional opening 274 is formed in cover 270 to allow light from light source 202 to exit spectrometer 200. If cover 270 is close to the sensor array 204, a diffuser 276 can be placed above the aperture 272 to improve the homogeneity of the light across the sensor array 204. For pixels away from the center of sensor array 204, the limiting aperture 272 can be off axis, so the positions and optionally the focal lengths of the microlenses of layer 226 can be adjusted to direct the light from the limiting aperture 272 to pixels of sensor array 204. In an example the height of the cover over sensor array 204 can be about 2 mm and the diameter of aperture 272 can be about 500 microns. A diffuser 276 may be a thin layer of polytetrafluoroethylene (PTFE) or ground glass attached to the outside of the cover.

Figure 2C:
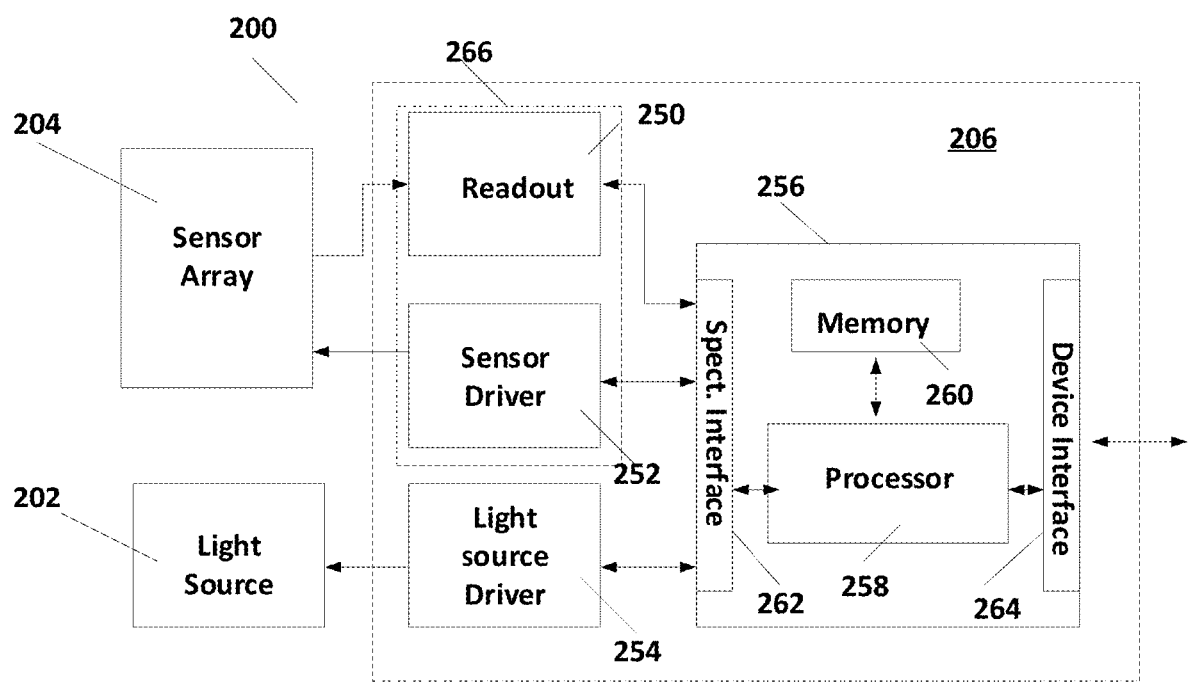

FIG. 2C illustrates a circuit diagram of spectrometer 200. As illustrated in FIG. 2C, processing circuitry 206 includes a controller 256. Controller 256 can be any controlling circuit, including a microcontroller unit, a microcomputer, dedicated circuitry, or other device. Controller 256 may be dedicated circuitry, processors operated by a state machine, or any other device that is capable of receiving data from readout 250 and controlling sensor driver 252 and light source driver 254.

In some embodiments, controller 256 can interface with an external programmable device such as a microcontroller (MCU) or application processor (AP). In addition, controller 256 may interface with processors of mobile device 100, and therefore is controlled by instructions stored in mobile device 100. Consequently, processing circuitry 206, which includes controller 256, receives data from sensor array 204, provides processing, and outputs data to an external programmable device.

As illustrated in FIG. 2C, in some embodiments controller 256 may itself be a microcontroller unit (MCU) 256 that can be interfaced to external processors in mobile device 100. MCU 256 includes a processor 258, memory 260, and interfaces 262 and 264. Memory 260 can include both volatile and non-volatile memory and as such may store instructions executed by processor 258 and data used in the processing of data in spectrometer 200. Processor 258 can also be coupled to a device interface 264 to interface with a mobile device such as other processors in mobile device 100. Processor 258 is also coupled to a spectrometer interface 262, through which processor 258 communicates with a light source driver 254, and sensor circuitry 266, which includes a sensor driver 252 and a readout 250.

Light source driver 254 is coupled to drive light source 202 at the direction of MCU 256. Sensor driver 252 is coupled to drive light sensor elements of sensor array 204, in particular to provide power and control signals to sensor array 204. MCU 256 is also coupled to readout 250, which is coupled to receive signals from each of the active areas (pixels) of sensor array 204. Readout 250 can include analog filtering, amplification, integration, and digitization of signals received from light sensor elements of sensor array 204. In some embodiments, readout 250 may include analog integrators that integrate over time periods set by programming in microprocessor 256 the current signals received from sensor array 204. In embodiments where light source 202 is the flash from a camera, light source driver 254 can provide a signal to a supporting device that drives the camera flash accordingly.

Figure 3:
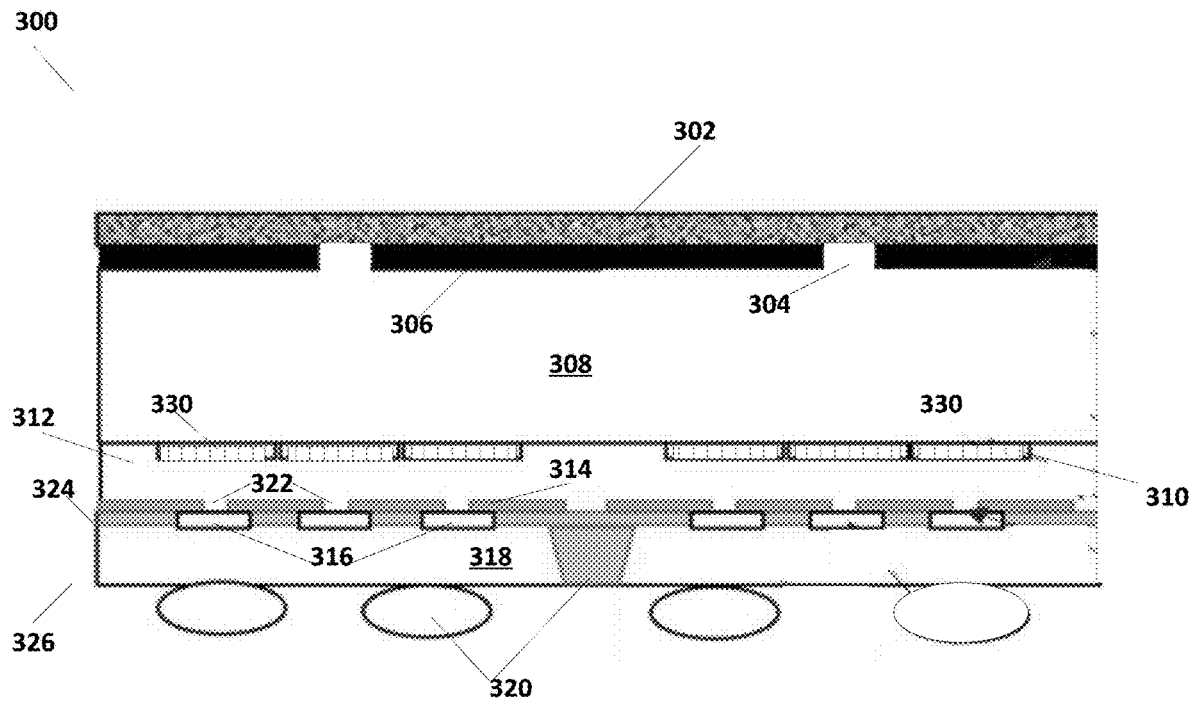
FIG. 3 illustrates a cross section of a spectrometer sensor array according to some embodiments.

FIG. 3 illustrates a spectrometer sensor 300 according to some embodiments. Spectrometer sensor 300 can include a pixel array 324 of individual pixels 316 formed in or mounted on a substrate 318 to form an optical sensor array 326. As discussed above, pixel array 324 can be, for example, a CMS, CCD, or IR-ROIC array. Electrical contacts 320, which may include solder bumps as well as through-substrate vias, can be used to make electrical contacts to individual pixels 316 of pixel array 324, but is more likely to provide electrical contacts to processing circuitry 206 as illustrated in FIG. 2C, which may be formed in substrate 318.

An output aperture array 314 is formed over pixels 316 such that each of pixels 316 receives light through one of output apertures 322 of output aperture array 314. Spectral filtering microlenses 310 are formed over each of pixels 316 and separated from pixels 316 and corresponding apertures of aperture array 314 by a focal distance spacer layer 312. Each spectral filtering microlens 310 focuses a spectral transmission profile that is unique to each pixel onto the corresponding pixel 316 such that the spectral transmission profile varies across the array. Air-gap input apertures 304 are formed in an opaque material 306 formed over spectral filters 310. Apertures 304 are spaced from microlenses 310 by a spacer 308, which may be a glass wafer spacer or other transparent material. A diffuser 302 may be formed over opaque material 306 and input aperture 304.

As discussed above, spectrometer 300 according to some embodiments is based on an array of pixels 324 where each pixel 316 shares a similar field of view because light either enters from a strong diffuser 302 or from a diffuse source/target. FIG. 3 illustrates the example where a diffuser 302 is formed. Spectrally filtering microlenses 310, which can be based on a dispersive lens and aperture combination, functions as a spectral bandpass filter such that different spectral ranges that from the spectral transmission profile are detected at each of pixels 316. Spectrally filtering microlenses 310 can be formed of subwavelength features 330, for example with pinhole structures having subwavelength extent, such that the spectral transmission through each of microlenses 310 includes a wavelength dependent focus that can be varied across the array of microlenses 310. Consequently, a spectral transmission onto each of pixels 316 in sensor array 324 can be varied by the spectral transmission through each of microlenses 310. Measuring the light input to each of pixels 316, then, can provide a spectroscopic mapping of the light incident on spectrometer 300.

Pixels 316 can be electronically coupled to processing circuitry formed in substrate 318, which is coupled to electrical contacts 320. As discussed above, the processing circuitry may be processing circuitry 206 as illustrated in FIG. 2C. Consequently, the spectroscopic mapping measured by optical sensor array 324 can be output electronically through electrical contacts 320. Spectrometer 300, as shown in FIG. 3, includes electrical contacts 320 to the bottom side of optical sensor array 324. Electrical contacts 320 provide electrical conductivity to processing circuitry formed in substrate 318 and provides data related to the spectral information from pixels 322.

As discussed above, electrical contacts 320 include through silicon vias in silicon substrate 318 as well as ball connectors that interface spectrometer 300 to other components on a printed circuit board. Electrical contacts 320 are formed substrate 318 of image sensor 326. There are a variety of techniques for forming electrical contacts 320, including through silicon vias (TSV). Typically, this involves thinning substrate 318 substantially, however at this point transparent spacer 308, which may be a glass handling wafer, provides most of the mechanical strength to spectrometer 300.

As discussed above, then, spectrometer 300 includes an optical sensor array 324 that includes a substrate 318 with a lateral dimension, a bottom side, and a top side that receives light into pixels 316. Further, an array of spectral filters 310 is formed over optical sensor array 324. As discussed above, spectral filters 310 can be formed of microlenses having subwavelength features 330 which are systematically varied across the array of spectral filters 310 to obtain varied spectral transmissions through to pixels 316 in optical sensor array 324. In some embodiments, each filter 310 in the array of spectral filters is arranged to focus light of a particular wavelength range determined by the subwavelength features 330 through apertures 322 and provides a spectral transmission profile on a corresponding pixel 316. As illustrated in FIG. 3, the array of spectral filters 310 is spaced from pixels 316 in optical array 324 by a spacer 312 arranged such that the focal point of each of spectral filters 310 for the frequency of light that is focused onto pixels 316. Consequently, spectral filters 310 focuses light from input aperture 304 through output aperture 322 onto pixels 316 such that pixels 316 receive light of a unique spectral transmission profile. Spacer 312 then corresponds with the focal distance between spectral filter microlenses 310 and the corresponding pixels 316. Spacer 312 can be formed of a transparent dielectric material. The focal distance can, for example, be less than 25 um.

Output apertures 322 can also be open areas or can be formed from a transparent dielectric. The focus of light from spectral filter microlenses 310 provides an area of focus on output aperture 322. In some embodiments, the open areas of output apertures 322 can be less than 10% of the focal area created by spectrally filtering microlenses 310 and spacer 312. Output apertures 322 can be formed in a layer of absorptive material.

Spectrometer 300 includes a transparent spacer 308 attached above spectral filters 310. Transparent spacer 308 has a thickness that is less than the lateral dimension of optical sensor array 324. Transparent spacer 308 can be any transparent material, including a glass spacer or other dielectric material. Opaque mask 306, where input apertures 304 are formed where light can pass, is formed on transparent spacer 308. Opaque mask 306 can be formed of a material that strongly absorbs light incident on spectrometer 300. In some embodiments, there may be four or more spectral filters 310 below each of input apertures 304. Considering the transverse direction traversed by light rays traveling at a maximum angle refracted in transparent spacer 308, input apertures 304 are spaced by a separation that keeps light entering from each of the input apertures 304 from overlapping on spectral filters 310. In some embodiments, the minimum separation between input apertures 304 is twice the maximum transverse direction determined by the maximum angle, the thickness of transparent spacer 308, and the index of transparent spacer 308.

As shown in FIG. 3, in some embodiments a diffuser 302 is formed on opaque mask 306 over spacer material 308. In some embodiments, light incident on spectrometer is already diffuse. Transparent spacer 308 is separated from diffuser 302 by opaque material 306 with input apertures 304. The index of refraction of the material forming transparent spacer 308 and the index of refraction of the material forming diffuser 302 is greater than the index of refraction of the material formed in input aperture 304, which in some embodiments is air.

The optics can be formed monolithically on top of the image sensor array of pixels 316. With multiple smaller apertures 322 to illuminate respective portions of sensor array of pixels 316, a much smaller overall height can be achieved. This enables diverse space-constrained applications and potentially reduced costs. In some embodiments, transparent spacer 308 can have a thickness of about 0.2 to 1.0 mm. Input apertures 304 can be spaced than the thickness of transparent spacer 308. The diameter or width of input aperture 304 can be, for example, less than half the thickness of transparent spacer 308.

Spectrometer 300 illustrated in FIG. 3 can be constructed from a sensor array wafer 326 that includes substrate 318 and pixel array 324, the filter output apertures 322, a dielectric 312 setting the focal distance, and the spectral filtering microlens array 310, which can be formed on top of a wafer 326 by photolithography methods. A glass handle wafer 308 is then bonded to the wafer 326 over microlens filters 310 with a transparent glue. Input apertures 304 are formed on the glass 308 in an opaque mask 306. The thickness of glass handle wafer spacer 308 sets the distance from input apertures 304 to the spectral filters 310. Forming input apertures 304 can be accomplished before or after bonding of opaque material 306 to glass 308. In the case of a thick opaque mask layer 306, a diffuser 302 may be attached on top of the opaque material 306, thereby creating an air gap between diffuser 302 and glass spacer 308 at input apertures 304.

Light from diffuser 302 entering glass spacer 308 through input aperture 304 refracts to less than about 45 degrees, or 42 degrees for the most common glasses. With adjacent input apertures 304 being separated sufficiently, light from adjacent apertures 304 can be limited to be incident on a selected region of image sensor array 324. Whereas, if diffuser 302 is formed in the handle wafer glass 308, for instance by sand blasting or grinding the glass, light may be scattered into very high angles and pixels may receive light from more than one aperture 304 and from high angles, which is less desirable. Thus, an air gap (or low index material) that forms input aperture 304 that is present between diffuser 302 and the handle wafer glass spacer 308 is useful for the invention. Consequently, diffuser 302 may be, for example, patterned (engineered diffuser) in glass or plastic, ground glass, Teflon, or any other suitable diffusing medium and attached onto opaque material 306 in which input apertures 304 are formed.

In some embodiments, output apertures 322, dielectric focal layer and spectral filters 310 are formed on the transparent spacer layer 308. The transparent spacer layer 308 can then be assembled with the optical sensor array.

Electrical contacts 320 are formed substrate 318 of image sensor 326. There are a variety of techniques for forming electrical contacts 320, including through silicon vias (TSV). Typically, this involves thinning substrate 318 substantially, however at this point handle wafer glass spacer 308 provides most of the mechanical strength to spectrometer 300.

Individual spectrometers 300 can be singulated from the wafer using a cutting process such as a dicing saw, laser cutting, scribe and cleave, or other methods. This results in planar sidewalls shared by substrate 318 and glass spacer and handle wafer 308. Diffusers 302 can be assembled on diced spectrometers. The order of assembly of optional diffusers 302 above input apertures 304 can be accomplished prior to or after being separated into separate spectrometers on the wafer.

In some embodiments, spectrometer 300 is formed with high-temperature compatible materials. Such construction is useful for a spectrometer module that can be attached to a printed circuit board using a solder reflow process at temperatures that are typically around 135-300° C., usually peaking at about 250° C.

Figure 4:
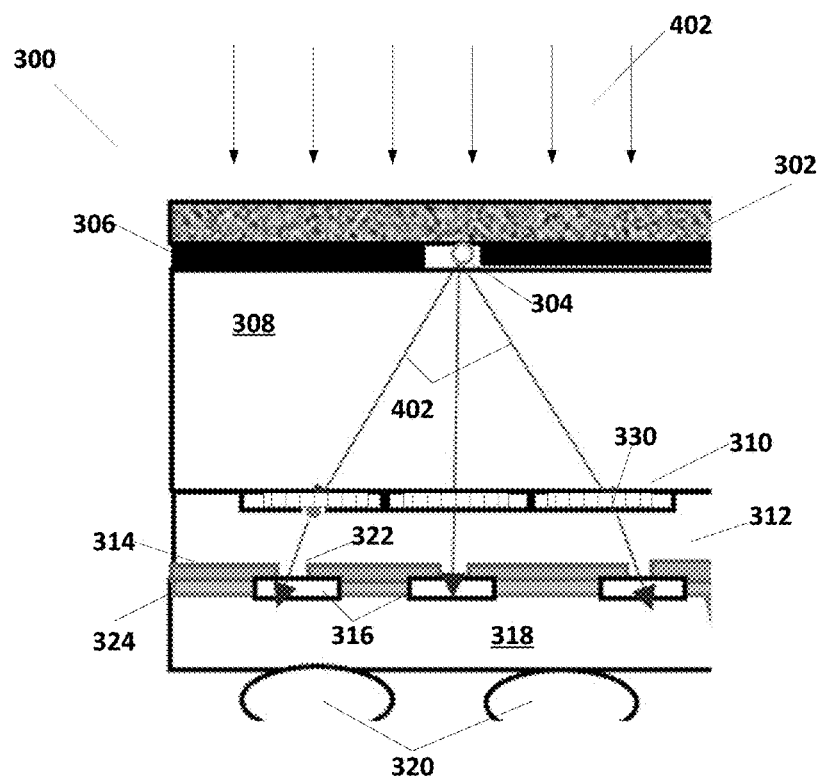
FIG. 4 illustrates light arrays in a cross section of the spectrometer sensor array illustrated in FIG. 3.

FIG. 4 illustrates operation of spectrometer 300. Light 402 incident on spectrometer 300 is incident on diffuser 302 or, if diffuser 302 is not present, emanates from a diffuse source of light. FIG. 4 also illustrates the shift of light through output apertures 316 through an input aperture 304, transparent spacer 308, and spectral filters 310 that are associated with input aperture 304. Consequently, light 402 is incident on input apertures 304, which admits light to glass spacer 308 at a narrower angle (for example, less than 45° as discussed above). The thickness of glass spacer 308, therefore, determines how many microlens filters 310 and corresponding pixels 316.

In one example, the thickness of glass separator 308 can be about 650 um. An input aperture diameter of about 150 um can also be used. With those parameters, the air-equivalent angular subtense is about 20°. Since wafer level processes are used to form spectrometer 300, the alignment of input aperture 304 to array 324 can be very precise. For example, lithographically-defined features typically have alignment tolerances in the micron range, whereas die assembly processes are in the tens of microns range. In an example with an 8×8 sensor array with 50 um pitch, the angle to edge or corner can be 17 or 23°, or air equivalent of 25 or 33°.

To accommodate more pixels 316 without increasing the height of spectrometer 300, more input apertures 304 can be used. A glancing incidence light ray 402 (FIG. 4 illustrates light rays 402 at normal incident to the surface of diffuser 302) refracts to maximum refracted ray angle—typically about 42 degrees for a glass air interface. The maximum refracted angle M in radians is given by $M = \operatorname{asin}(n1/n2)$, where n1 is the index of refraction of the material above glass spacer 308 (e.g. 1 for the air gap in input aperture 304) and n2 is the index of refraction of the glass in glass spacer 308. In an example where the thickness T of glass spacer 308 is 500 um, the maximum distance L a ray can traverse laterally is given by $L = T * \tan(M)$.

Accordingly, the distance between input apertures 304 should greater than 2L so that each set of pixels 316 receives light through a single one of input apertures 304. For glass with index n2=1.45, L~950 um. For input apertures 304 with a diameter of 100 um, another 100 um should be added, so the aperture spacing should be greater than about 1.05 mm.

With a 100 um diameter input aperture 304, the angular subtense at sensor array 324 is about 0.2 radians, or about 11.5° (or the air equivalent of 16-17°). If filter microlens array 310 has a pitch of 50 um and a 4×4 array of pixels 316 is placed under each microlens of microlens array 310, then the chief ray angle from the center of the input aperture to the edge of each lens array is 11°. The angle to corner is 16°. For small angles, the equivalent angles in air can be determined by scaling the angle in glass by the index of refraction n2.

Spectral microlens filter array 310, which uses microlenses and pinholes, is selective for light within a limited input angle range. High angle rays focus off-axis, and away from the output aperture (pinhole) 322. Out of band light is not strongly focused and may contribute some amount of crosstalk if present. If this is tolerable, spectrometer 300 can be calibrated as such. In this case, the spacing between the apertures can be reduced to less than the minimum specified by the maximum refracted light ray angle, for example 600 um.

Figure 5:
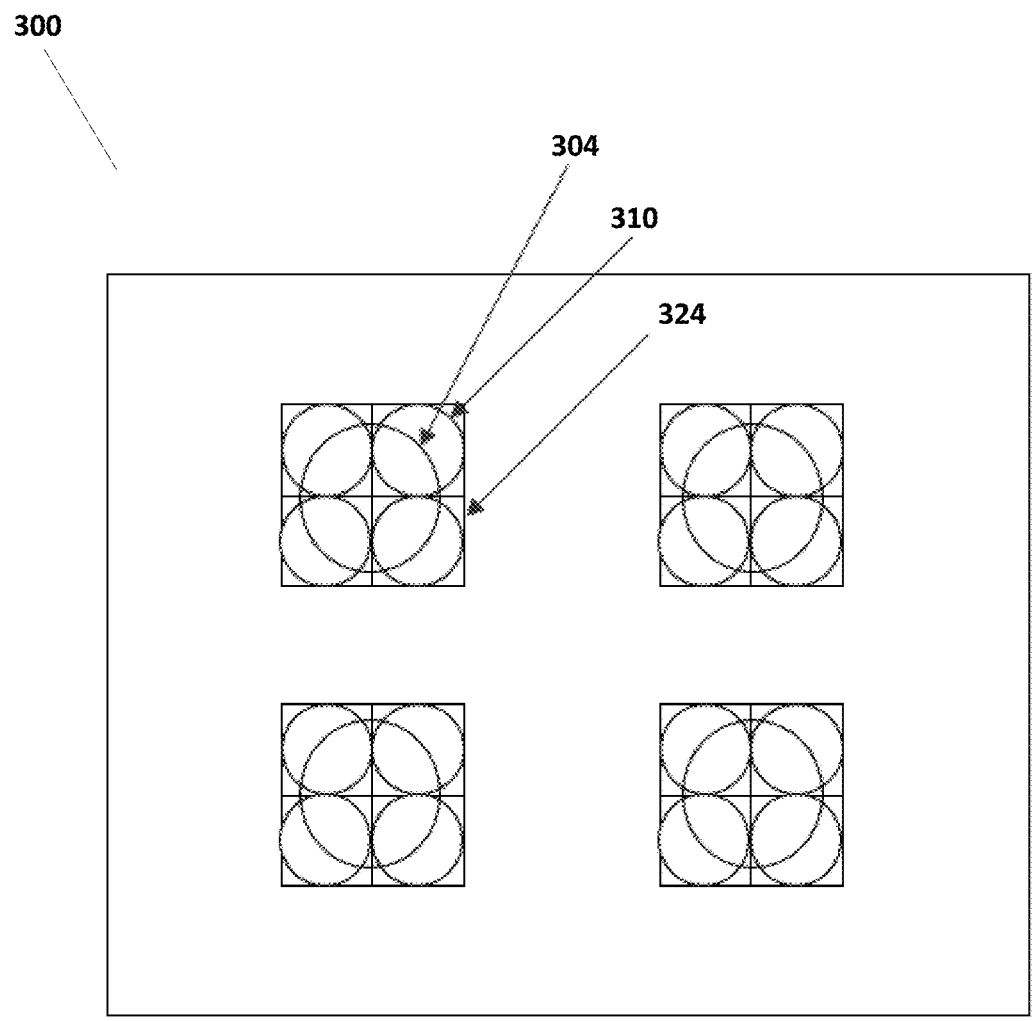
FIG. 5 illustrates a planar view of the spectrometer sensor array illustrated in FIG. 3.

FIG. 5 illustrates a planar view of spectrometer 300. As is illustrated in FIG. 3, input aperture 304 overlays filtering microlens 310. In the example illustrated in FIG. 5, four filtering microlenses 310 are under each input aperture 304. As is further illustrated, a pixel 316 of pixel array 324 is under each of filtering microlenses 310. As is further illustrated in FIG. 5, an array of separated input apertures 304 is illustrated.

Consequently, as discussed above embodiments according to the present invention include a monolithic spectrometer with one or more input apertures for simple, low cost and robust assembly. The spectrometer is based on a light sensor array 324 of pixels 316, which may be a CMOS, CCD or IR-ROIC that are commonly used for imaging. As discussed above, sensor array 324 is not used for imaging. Each pixel 316 shares a similar a field of view because light either comes from a strong diffuser 302 or diffuse source/target. The pixels 316 are each covered with a spectral filter 310. Spectral filters 310 are described can be based on a dispersive lens and aperture combination. The focal length of the dispersive lens varies with different wavelengths of light. The output aperture 322, placed over each pixel 316, operates as a spatial filter and functions as a spectral bandpass filter.

The monolithically structure formed on sensor array 324 can be formed with wafer-scale processes as described above. There may be one or more input apertures 304 formed above sensor array 324. When multiple smaller input apertures 304 are used to illuminate respective portion of sensor array 324, a much smaller overall height can be achieved enabling diverse space-constrained applications and potentially reducing costs.

The above detailed description is provided to illustrate specific embodiments of the present invention and is not intended to be limiting. Numerous variations and modifications within the scope of the present invention are possible. The present invention is set forth in the following claims.

What is claimed is:

1. A spectrometer, comprising:
an optical sensor array, the optical sensor array including a substrate and an array of pixels formed on the substrate;
a spectral filter array formed over the pixels of the optical sensor array, the spectral filter array filtering incident light such that each pixel receives light of a spectral transmission profile associated with the pixel;
a transparent spacer formed over the spectral filter array; and
an opaque mask on the transparent spacer having input apertures allowing light through the transparent spacer and onto a portion of the spectral filter array,
wherein spectral filters in the spectral filter array include dispersive elements having subwavelength features arranged to focus light from the input apertures onto pixels of the array of pixels, wherein the subwavelength features vary across spectral filters in the spectral filter array such that each pixel in the array of pixels receives light having a spectral transmission profile.

2. The spectrometer of claim 1, further including a focal spacer formed between the spectral filter array and the optical sensor array, the focal spacer having a thickness corresponding to a focal length of filters in the spectral filter array.

3. The spectrometer of claim 2, wherein the focal length is less than 25 um.

4. The spectrometer of claim 1, further including output apertures formed between the focal spacer and the array of pixels.

5. The spectrometer of claim 4, wherein the output apertures are formed in an absorptive material formed over each pixel in the array of pixels.

6. The spectrometer of claim 4, wherein the output apertures have an area less than 10% of a focal area of the spectral filters in the spectral filter array.

* * * * *